Aug. 17, 1937. D. E. CRABB 2,090,473
AUTOMOBILE HOOD SUPPORT
Filed Sept. 1, 1934 3 Sheets-Sheet 1

Inventor:
Donald E. Crabb
By
Wilson, Dowell, McCanna & Wintercorn
Attys.

Aug. 17, 1937.   D. E. CRABB   2,090,473
AUTOMOBILE HOOD SUPPORT
Filed Sept. 1, 1934   3 Sheets-Sheet 2
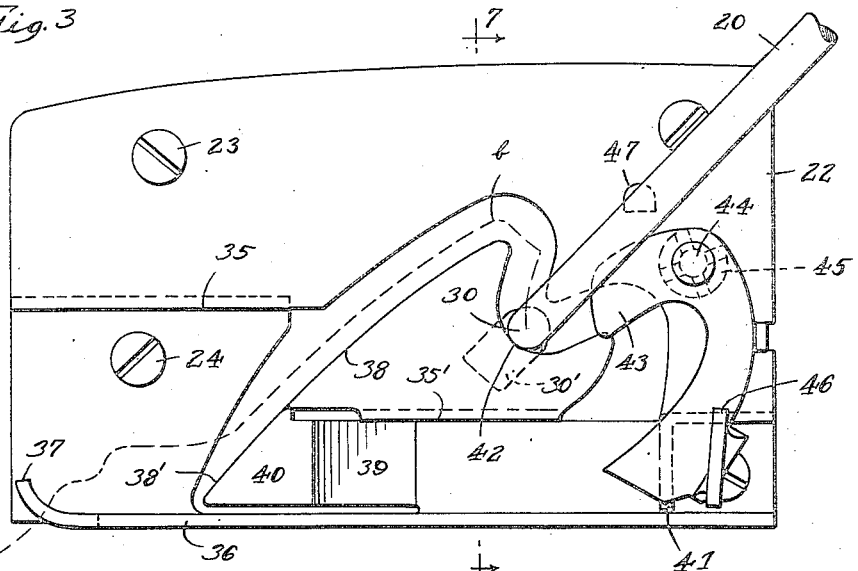
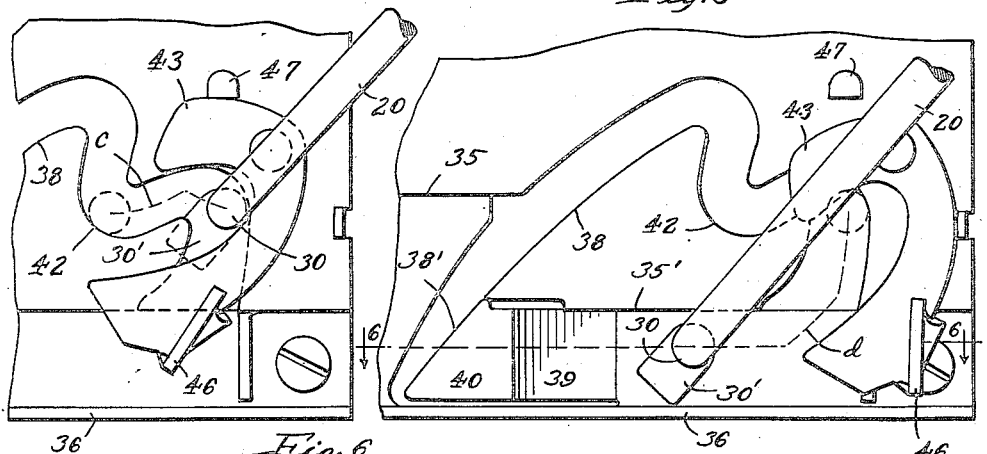
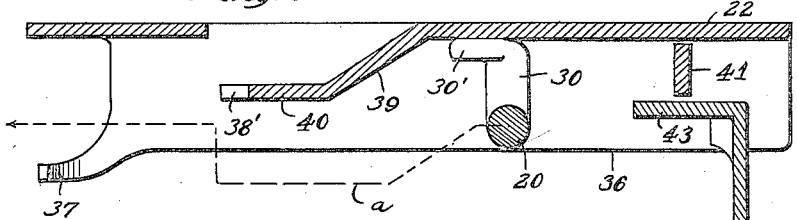

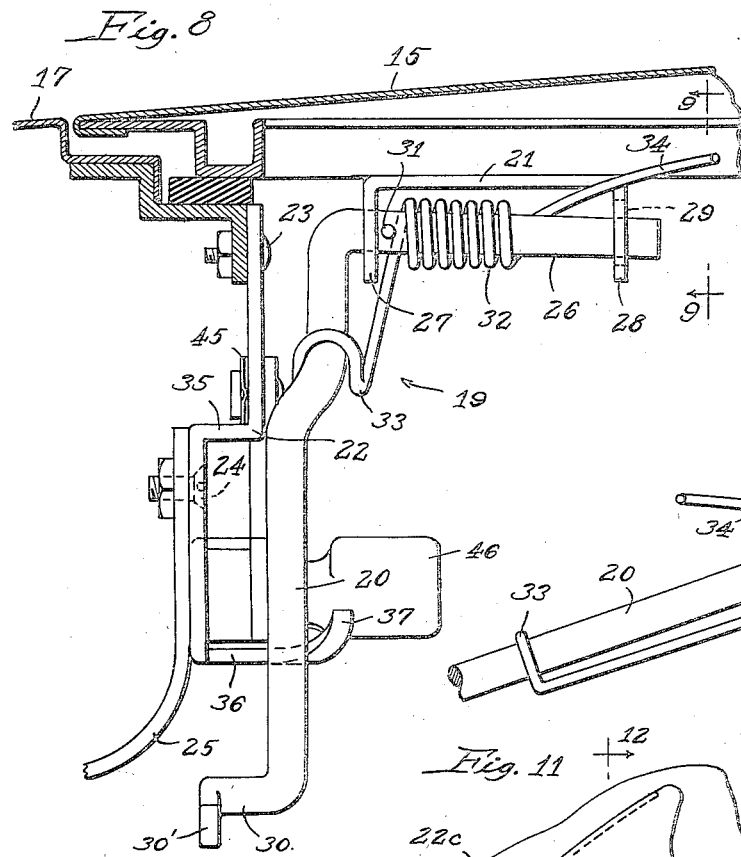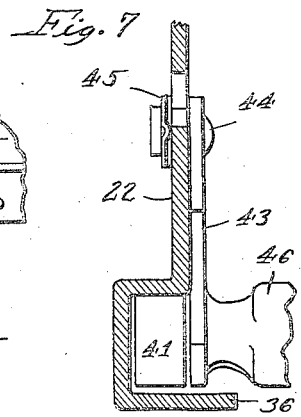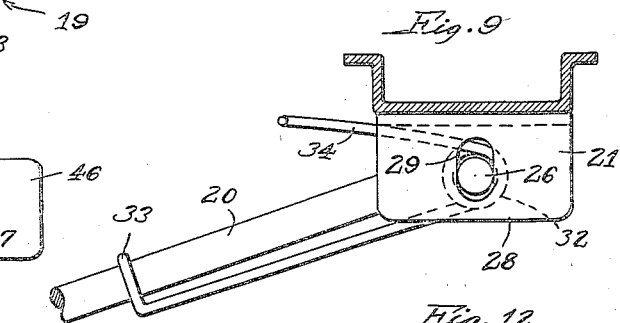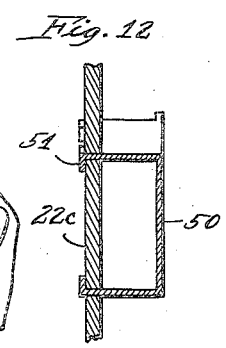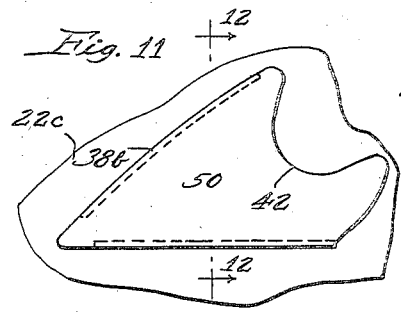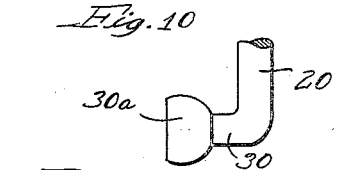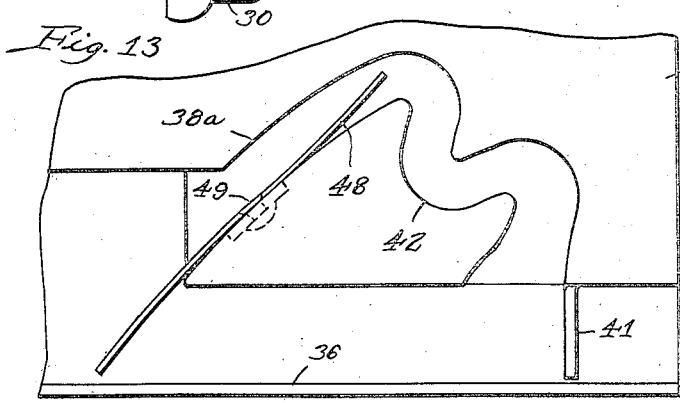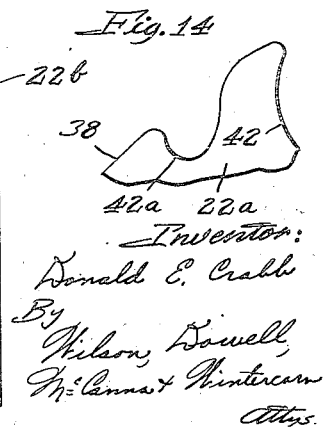

Patented Aug. 17, 1937

2,090,473

UNITED STATES PATENT OFFICE 2,090,473

AUTOMOBILE HOOD SUPPORT

Donald E. Crabb, Detroit, Mich., assignor to The Atwood Vacuum Machine Company, a co-partnership composed of Seth B. Atwood and James T. Atwood, Rockford, Ill.

Application September 1, 1934, Serial No. 742,367

23 Claims. (Cl. 217—60)

This invention relates to supports for liftable hinged closures generally, and, while herein disclosed as applied to an automobile front hood, is applicable also to the lids for rear luggage compartments.

The large hoods required on the new streamlined automobiles have presented a problem insofar as providing a safe support therefor is concerned. The supports heretofore available are not dependable for such large hoods especially since wind pressure alone is apt to cause accidental dropping thereof. The principal object of my invention is to provide a support for such hoods, applicable also to lids, in which the supporting arm or prop cannot be released accidentally.

Another object of my invention is to provide a support in which a separate manually operable latch is provided to lock the supporting arm in operative position, so that the hood or lid cannot be lowered until the latch is moved to an out-of-the-way position.

Still another object is to provide a hood support in which provision is made to catch the supporting arm at an intermediate point of its travel to the normal operative position so as to support the hood in a slightly raised position and thus guard against dropping of the hood if the operator accidentally lets go of it, and also facilitate the raising of a heavy hood by one unequal to the task of lifting it to its full height in one movement.

The invention is also concerned with novel details of construction and arrangement as will presently appear from the following detailed description in which reference is made to the accompanying drawings, wherein—

Fig. 3 is an enlargement of the cam plate showing the supporting arm in hood supporting position;

Figs. 4 and 5 are fragmentary views similar to Fig. 3 illustrating the operation of the latch on the cam plate;

Fig. 6 is a horizontal section on the line 6—6 of Fig. 5;

Fig. 7 is a vertical section on the line 7—7 of Fig. 3;

Fig. 8 is a cross-section through the hood and adjacent front portion of the body taken on the line 8—8 of Fig. 2 and showing the right hand support in front elevation.

Fig. 9 is a sectional detail on the line 9—9 of Fig. 8;

Fig. 10 is a view of the free end of a supporting arm showing a different shape of cam follower provided thereon;

Figs. 11 and 12 are elevational and sectional details of a cam plate in which the principal portion of the cam is made in a separate piece applied to the plate;

Fig. 13 is a view of another cam plate illustrating a further modification, and

Fig. 14 is a fragmentary view of a portion of a cam plate showing still another modification.

Similar reference numerals are applied to corresponding parts throughout the views.

Figure 1:
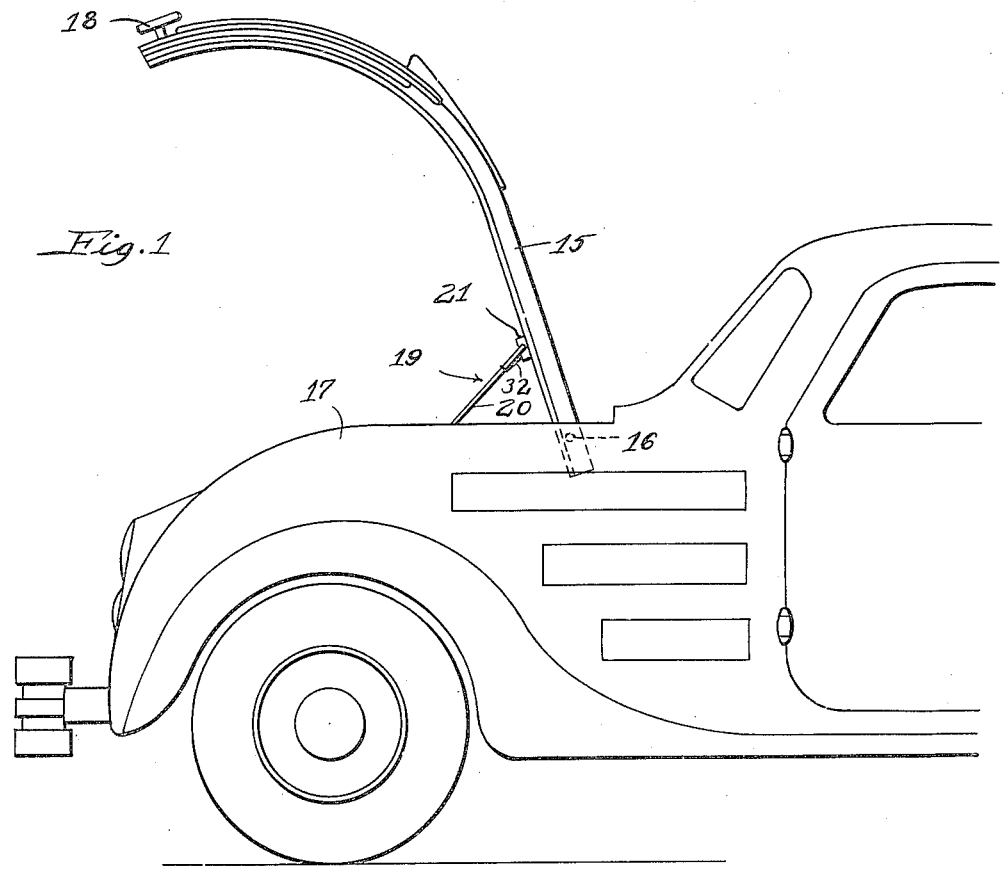
Figure 1 is a side view of the front portion of an automobile showing the type of hood for which the present support was particularly designed, the hood being shown in raised position.

Referring to Figures 1–9, and at first mainly to Figure 1, the numeral 15 designates a hood pivoted on a transverse axis, as at 16, between the side portions 17 of the front of an automobile. The hood has a handle 18 at its free end by means of which it is arranged to be raised and lowered, as well as locked, in its closed position, the handle being rotatable and connected with suitable locking means not shown. My invention is concerned with hood supports indicated generally by the numeral 19 for releasably but securely holding the hood in the elevated position illustrated in Figure 1. There are preferably two of these supports at the right and left hand sides of the hood; the right hand one is illustrated in Figs. 2–9. This hood support, briefly stated, comprises a supporting arm 20 pivotally mounted on a bracket 21 suitably secured to the bottom of the hood 15, arranged to cooperate with a cam plate 22 suitably secured to the adjacent side portions 17 of the car front, to hold the hood 15 propped in its raised position. Bolts 23 are shown for fastening the upper edge of the cam plate to the body portion 17, and other bolts 24 for fastening the lower portion to a brace 25 that is suitably secured at its other end to the inside of the side portion 17 of the car front. In this way, the plate 22 is held rigidly in a substantially vertical plane for proper cooperation with the supporting arm 20 and so as to properly assume the weight of the hood 15 in raised position.

The supporting arm 20 is formed from a piece of round rod bent at right angles to provide a substantially horizontal pivot portion 26 extending through holes in the downwardly bent ends 27 and 28 of the bracket 21 for oscillation of the arm 20 in a longitudinal plane with respect to the hood 15. The end 28 has a vertical slot 29 provided therein which allows the arm 20 to oscillate with respect to the end 27 as a fulcrum in a transverse plane so as to have the laterally bent end 30 of the arm 20 that serves as a follower for the cam surfaces on plate 22 be free to move laterally to whatever extent is necessary in riding on these cam surfaces. In other words, any slight irregularity in the relationship of the bracket 21 to the plate 22 will be compensated for by the lateral play of the arm 20. This feature avoids the necessity for carefully locating the plate relative to the arm; the arm can be assembled on the hood independently of the plate, and vice versa, with every assurance of the arm and plate cooperating properly. A cross pin 31 keeps the pivot end 26 of the arm 20 properly assembled in the bracket 21. A coiled torsion spring 32 coiled about the portion 26 has one end hooked onto the arm 20, as at 33, and the other end 34 bearing against the bracket whereby normally to urge the arm 20 in a counterclockwise direction, as viewed in Figures 1–5 and 9. This spring, by reason of the way the end 34 engages the bracket 21, as shown in Fig. 8, also urges the arm 20 toward the plate 22 and, of course, the slot 29 permits such movement, as previously described. The follower bend 30 on the arm 20 is, therefore, always assured of proper engagement with the cam surfaces on plate 22; the arm 20 does not rely upon gravity to fall into its locking or other positions, like so many other supports, and will, therefore, give the same performance regardless of the position of the car.

Figure 2:
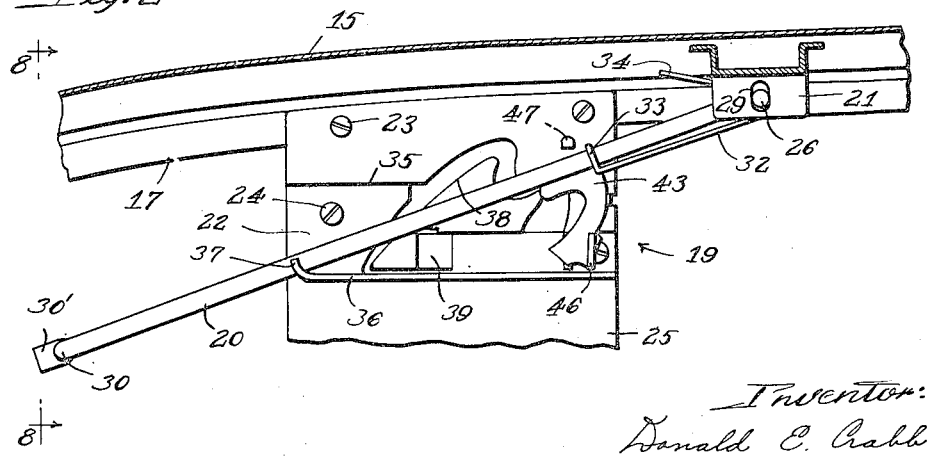
Fig. 2 is a longitudinal vertical section through a portion of the hood in closed position showing the right hand one of the two hood supports in side elevation.

The cam plate 22 is shown in Figs. 2–8 as stamped from a single piece of sheet metal bent longitudinally, as at 35 and 35', to offset the lower portion laterally with respect to the plane of the upper portion, and having its lower edge bent outwardly to form a longitudinal ledge 36 forming one portion of the cam track or surface. An upwardly projecting lug 37 at the front end of this ledge holds the arm 20 in its starting position on the plate, as shown in Figs. 2 and 8. The upper portion of the plate is slotted to provide a substantially M-shaped cam slot 38 starting at the line 35 and ending at the line 35'. The lower portion of the plate is bent outwardly, as at 39, and forwardly, as at 40, below the beginning of the slot 38, whereby to provide a surface 38' forming a continuation of the lower side of the slot 38 and reaching downwardly almost to the ledge 36, while also providing a switching surface 39 over which the follower end 30 of the arm 20 may ride in returning to the starting position, as indicated by the dotted line a in Fig. 6. A lug 41 bent downwardly from the line 35' adjacent the outlet end of the slot 38 reaches almost to the ledge 36 and keeps the follower end 30 of the arm 20 from moving along the ledge 36 in any direction but toward the surface 39. The knob 30' formed on the follower end 30, keeps the arm 20 from moving laterally sidewise out of the slot 38. If desired, a round knob 30a can be provided on the arm instead of the flat knob 30', as shown in Fig. 10.

The depressed middle portion 42 of the slot 38 is the point where the follower end 30 of the arm 20 rests when the arm is supporting the hood 15. The follower 30, in its travel to the point 42, moves along the dotted line b, shown in Fig. 3. The spring 32 tends to swing the arm 20 in a counterclockwise direction so that there is no danger whatever of the follower 30 moving back along the line b; its only possible movement would be in the opposite direction, toward the latch 43. This latch prevents the arm from moving in the direction to release the hood 15 and allow it to drop to closed position. The latch is pivoted at 44 on a rivet under which a corrugated spring washer 45 is compressed to frictionally hold the latch in whatever position it happens to be occupying. In Fig. 3, the latch is in closed position blocking the outlet end of the slot 38 so that the follower end 30 of the arm 20 cannot move out. The latch will retain this position until moved manually to the open position shown in Fig. 4, the projection 46 on the latch serving as a handle for operating the latch. The latch is of bell crank form and disposed in such relation to the outlet end of the slot 38 that when it is moved to open position the one end moves away from the slot but the other end is moved to a position across the slot, as shown in Fig. 4. A projection 47 on plate 22 limits the opening movement as appears in Fig. 4. With the latch in that position, the follower 30 is free to move along the dotted line c out of the depression 42 and into the outlet end of the slot, from which point it can then leave the slot along the dotted line d, Fig. 5. In leaving the slot, the follower end 30 of the arm 20 moves the latch 43 back to its initial position automatically so that the latch is set to lock the arm 20 in the hood supporting position when the arm is again moved along the line b of Fig. 3 to the depression 42 in the slot 38.

In operation, it will be seen that when the hood 15 is raised by means of its handle 18, the arm 20 under action of its spring 32 rides on the plate 22 so that the follower end 30 moves along the line b of Fig. 3, arriving in the depression 42 when the hood has been raised as far as it can go and then allowed to return slightly, just enough to let the follower end 30 seat in the depression 42. Once the arm 20 reaches the hood supporting position of Fig. 3, the latch 43 keeps it there since the spring 32 will not allow the arm 20 to move in any direction save toward the latch. In that way, there is absolutely no danger of the hood being accidentally released and allowed to drop to closed position. The operator must first move the latch to the opened position shown in Fig. 4 before he can lower the hood. It is obvious that there is no need for more than one of these latches on one of the two hood supports 19, although latches may be provided on both if desired. When the latch is opened, the operator can lower the hood by first raising the same slightly sufficiently to cause the follower end 30 to travel along the line c, shown in Fig. 4, whereupon the hood can be lowered and the follower end 30 travels first along the line d, Fig. 5, and then along the line a, Fig. 6, back to the starting position, Fig. 2. The action of the spring 32, which tends to urge the arm 20 not only in a counterclockwise direction but also toward the plate 22 as above described, always insures proper cooperation of the follower end 30 of the arm with the plate 22. There is sufficient play allowed for at slot 29 to take care of any slight irregularity in the mounting of the plate 22 with respect to the bracket 21 as well as allowing sufficient lateral movement of the arm 20 to ride over the switching surface 39 in going from the outlet end of the cam back to the inlet end, as shown in Fig. 6. The pivot end 26 of the arm 20 never reaches either end of the slot 29 and hence the spring 32 is always active in urging the arm 20 toward engagement with the plate 22 to function in the manner above described.

The cam plate 22 can be modified, as shown at 22a in Fig. 14, so that the M-shaped cam surface 38 will provide one or more other depressions 42a in advance of the depression 42 which will afford a seat for the follower end 30 of the arm 20 when the hood 15 is raised only part way to the position of Figure 1. In that way, if the operator should accidentally release the handle 18 before the arm 20 reaches the position of Fig. 3, the hood 15 will not slam down but will be intercepted in an intermediate position. This feature would also be advantageous for one not able to raise the hood to its full elevation in one movement.

The cam plate might also be constructed as shown at 22b in Fig. 13 with a leaf spring 48 fastened intermediate its ends, as at 49, in the slot 38a. With this construction, once the follower end 30 passes the upper end of the spring 48, it cannot return except by movement along the lines c, d and a, of Figs. 4, 5 and 6, the movement along the line a being modified to the extent that the arm 20 will not be forced to move outwardly from the plate 22b, as in Fig. 6, but will move past the lower end of the spring 48 by flexing it upwardly. The advantages of this construction are similar to those described in referring to Fig. 14.

The construction shown in Figs. 11 and 12 is a cam plate 22c in which a separate cam piece 50 of sheet-metal is mounted on the main plate, as by bent over lugs 51, to provide the cam surface 38b with depression 42 therein. This construction, it is thought, might be preferred to the one-piece construction shown in Figs. 2–7 from the standpoint of economy.

It is believed the foregoing description conveys a good understanding of the objects and advantages of my invention. The appended claims have been drawn with a view to covering all legitimate modifications and adaptations.

I claim:

1. In a device of the character described, comprising a supporting element and a closure element hinged thereon and arranged to be moved to a raised position, a stiff and substantially non-resilient supporting arm pivotally mounted on one of said elements, a cam mounted on the other element, the cam being so disposed with respect to the supporting arm that the free end of said arm rides on the cam in the swinging movement of said closure, the cam being substantially M shaped, whereby to provide a central depression for engagement by the end of said arm in the raised position of the closure, the one side leg of the M being the inlet side and the other side leg the outlet side of said cam, and said arm being engageable in said depression in moving from the inlet leg toward the outlet leg, and spring means tending normally to move the supporting arm forcibly about its pivot in one direction independently of the action of gravity so that the free end of said arm tends to move from the inlet leg toward the outlet leg of the cam regardless of the position of the supporting element and closure element, said cam being formed with a portion whereon the arm is arranged to ride from the outlet leg toward the inlet leg.

2. A device as set forth in claim 1, including means on the cam for releasably locking the supporting arm in engagement with the depressed portion of said cam.

3. A device as set forth in claim 1, including means on the inlet leg of the M-shaped cam for limiting retrograde movement of said supporting arm.

4. In a device of the character described, comprising a supporting element and a closure element hinged thereon and arranged to be moved to a raised position, a stiff and substantially non-resilient supporting arm pivotally mounted on one of said elements, a keeper mounted on the other of said elements, and spring means normally urging the arm to swing in one direction with respect to the keeper independently of gravity, the keeper having a recess arranged to receive the end of said arm when the closure is raised, whereby to support said closure in raised position, and said keeper having surfaces whereon said arm is guided toward and away from the recess in the raising and lowering of said closure, the spring means serving to keep said arm constantly under tension toward engagement with said surfaces regardless of the position of the supporting element and closure element.

5. A device as set forth in claim 4 wherein said arm is formed with a laterally projecting and enlarged end portion to engage in a slot provided on said keeper, and wherein said arm is pivotally mounted so as to be swingable laterally transversely with respect to the plane of its other pivotal movement, whereby to maintain substantially the same operative relationship of said end portion to said keeper when the support and closure are shifted laterally with respect to one another, the spring means being so disposed relative to the supporting arm whereby to urge the arm laterally toward the keeper in addition to urging said arm normally to swing in one direction relative to the keeper in the other plane of its movement.

6. A device as set forth in claim 4 wherein said keeper has at least one other depression provided therein in advance of the main recess arranged to be engaged by the supporting arm to support the closure in a partially raised position.

7. A device as set forth in claim 4 including manually releasable latch means for retaining the supporting arm in engagement with the recess in the keeper whereby to prevent accidental lowering of the closure.

8. A device as set forth in claim 4 including manually releasable latch means for retaining the supporting arm in engagement with the recess in the keeper whereby to prevent accidental lowering of the closure, said latch means comprising a bell-crank latch normally in a closed position relative to the recess but arranged to be swung to an inoperative position wherein one arm opens the recess, the other arm of said latch being moved in such operation into a position so that it is automatically returned to the initial position in the movement of the supporting arm away from the recess.

9. In a device of the character described, comprising a supporting element and a closure element hinged thereon and arranged to be moved to a raised position, a cam plate fastened on the support in spaced relation to the pivoting axis of the closure and disposed in a substantially vertical plane alongside the closure, a supporting arm pivotally mounted on and depending from the closure in slightly less spaced relation to the pivoting axis thereof, the free end of said arm being formed to provide a cam follower arranged to ride on cam surfaces provided on said plate, said plate having a ledge whereon said arm is arranged to rest in the lowered position of the closure, the cam surfaces of said plate extending in one continuous line starting and terminating at spaced points on said ledge so that the follower end is guided onto the cam surfaces from the ledge and off of the cam surfaces onto said ledge, said arm being swingable normally in one direction toward said ledge, and means on said plate for switching the follower end of said arm on said ledge from the return side to the forward side of the cam surfaces.

10. A device as set forth in claim 9 including spring means for normally urging the arm to swing toward the ledge.

11. A device as set forth in claim 9 wherein the arm is mounted loosely on the closure so as to be swingable laterally with respect to the plane of its normal pivotal movement, for the purpose described.

12. In a hinged closure support, comprising a supporting frame element and a closure element hinged thereon, a supporting arm pivoted at one end on one of said elements near the hinge axis, and a cooperating bracket mounted rigidly on the other element also near the hinge axis and in a vertical plane substantially parallel with the plane of said arm, said bracket having a one-way cam track thereon rising from a starting point to a high point, then descending into a recess, then rising again, and then descending again toward the starting point, a follower on the free end of said arm arranged to ride on said track into said recess, whereby to support the closure in a raised position, switching means between the starting rise and the finishing descent for causing said follower to ride onto the rise and travel the same route toward said recess upon each operation, and spring means normally urging the arm laterally toward the bracket to insure proper tracking of the follower and tending normally to swing the arm in one direction in the plane of its normal operation.

13. A support as set forth in claim 12 including means for releasably retaining the follower in the recess.

14. A support as set forth in claim 12 including means for preventing backward movement of said follower in traveling up the first rise of said track.

15. A hinged cover support comprising a rod pivoted at one end and having a lateral projection on its free end, a plate having an M-shaped slot provided therein to slidably receive said projection, and a laterally inclined surface beneath the slot extending from a point in the operating plane of the plate intermediate the lower ends of the legs of the slot forwardly and laterally arranged to cam the projection away from the plate, and spring means cooperating with the rod to urge the same laterally toward the plate and rearwardly relative thereto.

16. In a hinged cover support, a sheet metal plate formed to provide a vertical top portion having an M-shaped slot formed therein, and a horizontal bottom portion providing a ledge below and spaced from the outlet end of the slot but directly beneath the inlet end thereof, the plate being formed to provide a laterally and forwardly projecting portion above the ledge and behind the inlet end of the slot.

17. A hinged cover support of the class described comprising a rod having one end thereof bent substantially at right angles to provide a pivot portion and having the other end thereof bent to provide a lateral projection, a supporting bracket having laterally spaced perforated portions receiving the first mentioned end of said rod, said rod being pivotally received in one of said portions and pivotally and slidably received in the other of said portions whereby to permit swinging movement of the rod relative to the bracket in an operating plane, and movement laterally from said plane, a vertically disposed plate having an M-shaped slot arranged to receive the lateral projection on the free end of said rod, said plate being disposed on the opposite side of the rod from the aforesaid bracket and substantially parallel to the operating plane of said rod, and a single coiled torsion spring mounted on the first mentioned end of said rod between the spaced supporting portions of the bracket and having one end abutting the bracket and the other end abutting the rod so as to urge the rod to swing normally in one direction in its operating plane and also to move laterally toward said plate.

18. A device as set forth in claim 17, including a manually operable keeper plate pivoted on the aforesaid plate adjacent the outlet end of the M-shaped slot, the keeper plate having one portion disposed behind the crotch portion of the slot in the locking position of said plate and having another portion swingable to a position across the outlet end of the slot when the first portion is moved to an inoperative position relative to the slot, whereby the keeper plate is arranged to be moved to a released position manually and is arranged to be set automatically by the engagement of the lateral projection on the rod with the last named portion of the keeper plate upon disengagement of said projection from the slot, substantially as described.

19. In a hinged closure support, comprising a supporting element and a closure element hinged thereon and arranged to be moved to a raised position, a supporting arm pivoted at one end on one of said elements at a point spaced from the hinge axis, a cooperating bracket mounted rigidly on the other element at another point similarly spaced from the hinge axis and in a vertical plane substantially parallel with the plane of said arm, and having cam surfaces provided thereon arranged to be engaged by the free end of said arm to guide the same into and out of a recess provided on said bracket, whereby to support the closure in a raised position, and spring means tending normally to swing the arm in one direction in the plane of its normal operation relative to the bracket, said spring means being so disposed with respect to said arm whereby it also has a component in the direction of said bracket tending normally to urge the arm laterally toward the bracket to insure interengagement of the free end of said arm with the cam surfaces on said bracket.

20. A hinged cover support, comprising a rod pivoted at one end and having a lateral projection on its free end, and a plate having an M-shaped slot provided therein to slidably receive said projection and a laterally inclined surface beneath the slot extending from a point in the operating plane of the plate intermediate the lower ends of the legs of the slot forwardly and laterally arranged to cam the projection away from the plate, said rod being arranged to yield sufficiently to permit the projection thereon to move outwardly relative to said plate.

21. A bracing device for hinged covers and the like, comprising a member having a guide channel therein shaped to provide an ingress portion, an escapement portion and an intermediate communicating latching portion, a universally pivoted stay including a prop and pivot arm mounted for vertical and lateral swinging movement and having a coupling head at its free end engageable with said channel, said head engaging the ingress portion of the channel during the opening of the cover and the latching portion thereof in the open position of the cover, and a spring applied to the pivot arm of said stay and having portions acting on the prop and pivot arm of the stay, respectively, for urging said stay to swing vertically in a direction toward said channel member and in a lateral direction from the ingress to the escapement portion of the channel.

22. A bracing device for hinged covers and the like, comprising a member having a guide channel therein shaped to provide an ingress portion, an escapement portion and an intermediate communicating latching portion, a bracket, a pivoted stay mounted on said bracket to swing vertically and having a connection therewith to permit a lateral swinging thereof, said stay having a coupling head at its free end engageable with the ingress and escapement portions of said channel during the movement of the cover to its open and closed positions, respectively, and engageable with the latching portion of the channel in the open position of the cover, and means applied to the stay for yieldingly urging said stay in a direction toward the face of the channeled member and in a lateral direction in traversing from the ingress to the escapement portion of said channel, said means including a spring coiled about the pivoted end of the stay and having one end thereof engaging said bracket and the other end thereof engaging the stay.

23. A bracing device for hinged covers and the like, comprising a member having a guide channel therein shaped to provide an ingress portion, and escapement portion and an intermediate communicating latching portion, a bracket having spaced flanges, one of said flanges having a pivot-opening therein and the companion flange having an elongated opening therein, a pivoted stay mounted on said bracket to swing vertically and having a pivot-arm at one end engaging said bracket openings whereby said stay is free to rock laterally, said stay having a coupling head at its free end engageable with the ingress and escapement portions of said channel during the movement of the cover to its open and closed positions, respectively, and engageable with the latching portion of the channel in the open position of the cover, and a spring applied to said stay for constantly urging it to swing vertically toward the channeled member and to rock laterally of said member in a direction from the ingress to the escapement portion of said channel.

DONALD E. CRABB.